INVENTORS
ROGER L. BEVARD
HARRY WAYNE JOHNSON
DON W. ERICKSON

By Bayard H. Michael

ATTORNEY

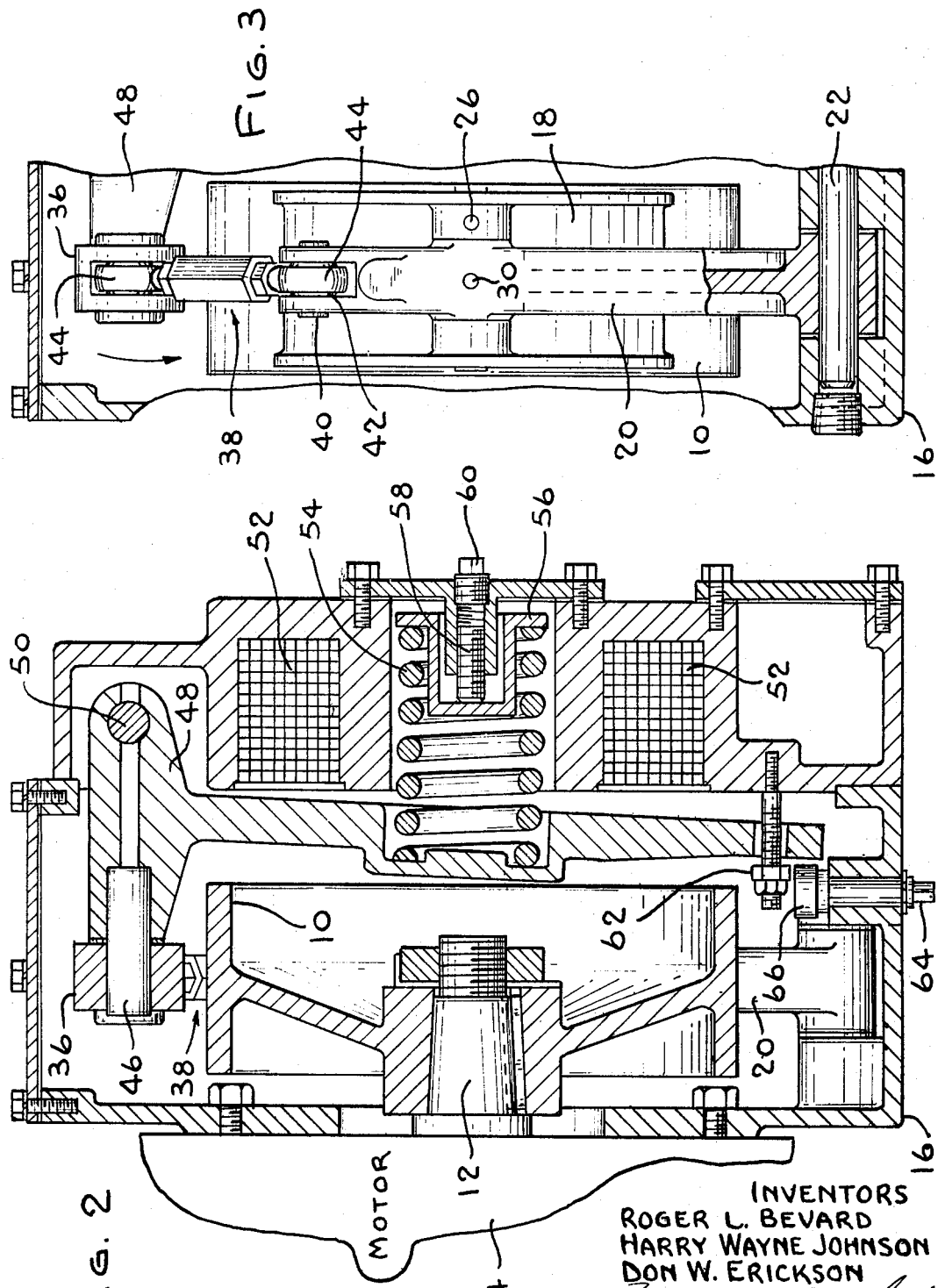

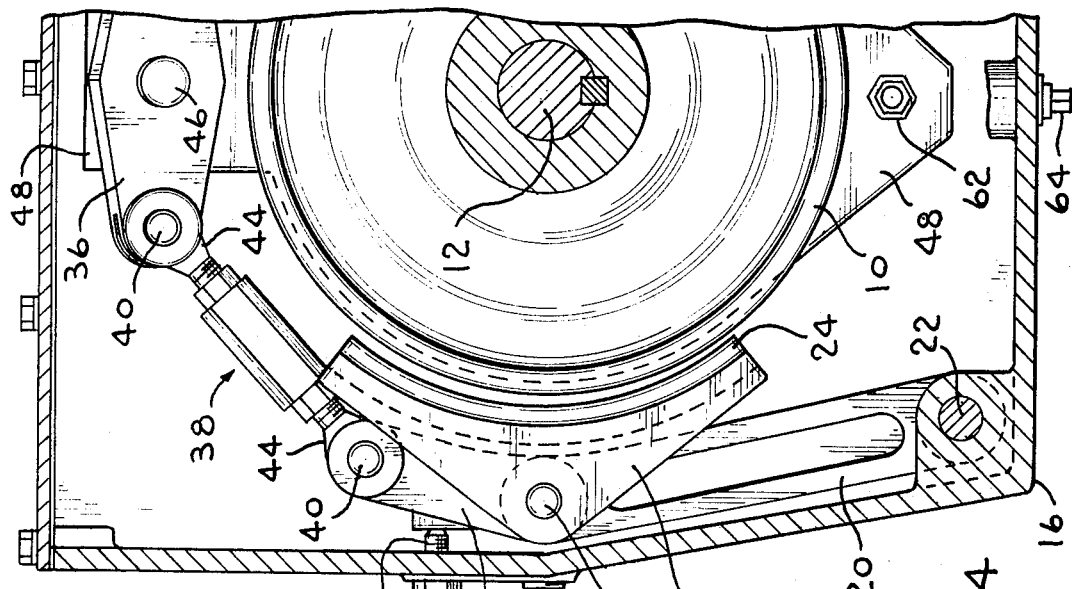
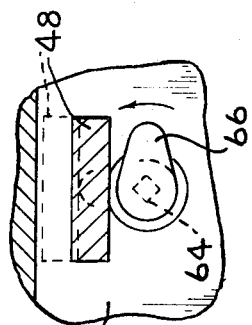
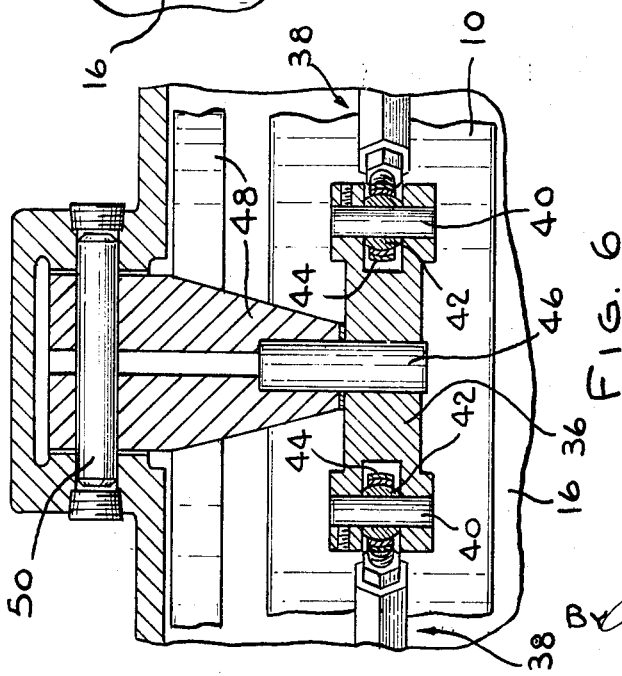
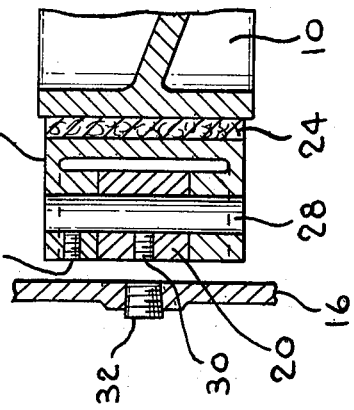
Fig. 4
Fig. 5
Fig. 6
Fig. 7
INVENTORS
ROGER L. BEVARD
HARRY WAYNE JOHNSON
DON W. ERICKSON
BY Bayard H. Michael
ATTORNEY 3,356,191
MAGNETIC BRAKE
Roger L. Bevard, Harry Wayne Johnson, and Don W. Erickson, Iron Mountain, Mich., assignors to Lake Shore, Inc., Iron Mountain, Mich., a corporation of Michigan
Filed Aug. 16, 1965, Ser. No. 479,887
5 Claims. (Cl. 188—171)

ABSTRACT OF THE DISCLOSURE

Energization of the coil overcomes spring loaded armature to release brake pads acting on the drum by moving the yoke down to spread pivoted brake arms by means of the reach rods. The reach rods have limited universal connections to accommodate the eccentric motion resulting from pivoting the armature at 90° to the brake arm pivots.

---

This invention relates to electric brakes and particularly to a design placing the brake in line with the motor rather than to one side as has been customary in the past.

The principal object of this invention is to reduce the size and cost of electric brakes.

In carrying out this invention we have placed the brake in line with the motor and the actuating coil is also placed in line. This resulted in introducing eccentricity into the brake linkage and it then became an object to overcome this eccentricity. The solution rests in the use of ball and socket (universal) mounted reach rods to obviate misalignment problems.

Cooling of the brake is improved since the coil housing is also a part of the brake housing and is exposed directly to atmosphere, eliminating dead air space found in conventional style brake housings between armatures and enclosures. This provides better heat dissipation.

Other objects and advantages will be pointed out in, or be apparent from, the specification and claims, as will obvious modifications of the single embodiment shown in the drawings, in which:

FIG. 2 is a vertical section as indicated by line 2—2 in FIG. 1;

FIG. 3 is a section on meandering line 3—3 in FIG. 1;

FIG. 4 is a fragmentary view similar to the left portion of FIG. 1 to show the brake released;

FIG. 5 is a fragmentary view of the brake shoe pivot;

FIG. 6 is a horizontal section on line 6—6 in FIG. 1; and

FIG. 7 is a fragmentary view of the manual release cam.

Figure 1:
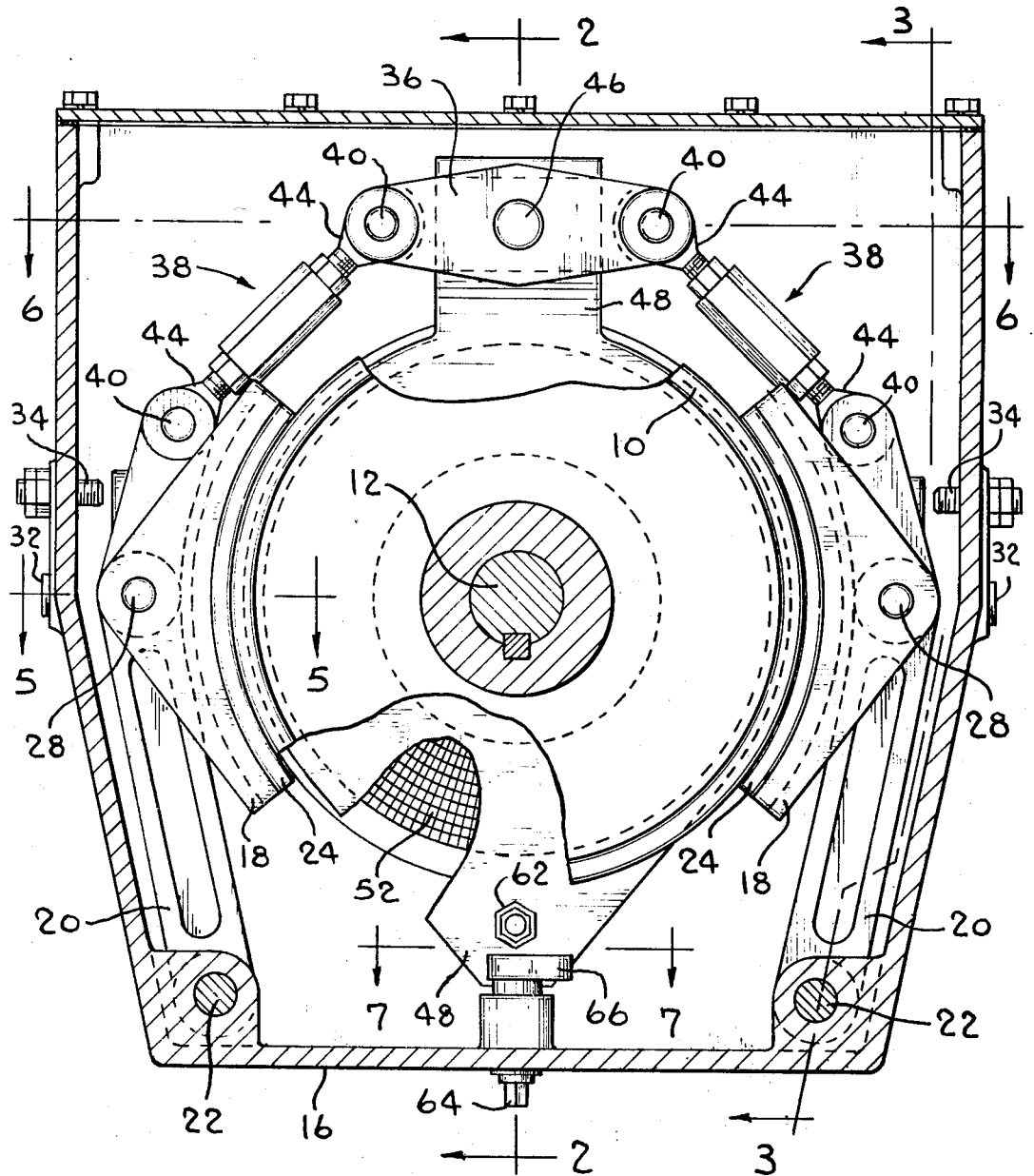
FIG. 1 is a sectional view from the left in FIG. 2 with some parts broken away.

In the prior art the electric brake has generally been separately housed laterally of the electric motor. Such an arrangement is costly and requires much extra space. In the present design the brake drum 10 is mounted directly on shaft 12 of the motor enclosed in housing 14. The brake housing 16 mounts directly on the motor housing and is supported thereby. Caliper brakes act on the drum. Thus a brake shoe 18 is carried on an arm 20 on each side of the drum. The arms are pivoted on pins 22 at the bottom of the housing and the brake pads 24 will contact the drum when the upper ends of the arms are drawn inwardly. Each shoe is connected to its support arm by a set screw 26 engaging pin 28 which is frictionally engaged by a nylon pad 30 threaded through the arm into engagement with the pin. Plug 32 can be removed to allow adjustment of pad 30 to restrain rocking of the shoe. When the brake is disengaged the upper end of each arm engages an adjustable limit stop 34 which equalizes shoe movement and prevents shoe drag on either side.

The upper end of each arm is connected to the central yoke 36 by an adjustable reach rod 38. The reach rod has a ball and socket connection to the yoke as may be seen in FIG. 6 where pin 40 carries the ball 42 upon which the complementary member 44 seats. A similar conection is provided at the lower end of the rod as seen in FIG. 3.

The yoke 36 is carried on pin 46 projecting from the upper portion of the armature 48 pivoted on shaft 50. The armature is spring loaded away from coil 52 by spring 54 compressed between the armature and seat 56 which can be adjusted by turning screw 58 after removal of plug 60 to thereby adjust the force applied to the brake. It will be understood the coil is energized to attract the armature against the spring force to rock the armature and move the yoke down to release the brake. The coil is energized when the motor is energized. When the motor is de-energized the coil is also de-energized and the spring sets the brake. Outward movement of the armature is limited by the setting of the brake but for assembly purposes the limit stop 62 is provided.

If it is desired to release the brake manually for any reason shaft 64 can be turned to rotate cam 66 against the lower end of the armature.

The coil need not be concentric with the shaft but design practices clearly indicate such location as desirable in absence of space limitations requiring another location.

Although but a single embodiment of the present invention has been illustrated and described, it will be apparent to those skilled in the art that various changes and modifications may be made therein without departing from the spirit of the invention or from the scope of the appended claims.

We claim:

1. The combination with an electric motor having a housing and a shaft projecting from the housing, of an electric brake including a brake housing secured to the motor housing, a drum mounted on the shaft inside the brake housing, a pair of arms pivotally mounted in the housing on opposite sides of the drum with the pivot axis of each arm generally parallel to the motor shaft, a brake shoe mounted on each arm, an armature mounted in the housing on an axis transverse the axes of the arms, a coil positioned to attract the armature, a spring urging the armature from the coil, linkage connecting each arm to the armature whereby movement of the armature is operative to set or release the brakes, said linkage including a projection on the armature, a pin carried by the projection generally parallel to the pivot axes of the arms, a yoke mounted on the pin, and a reach rod connecting each end of the yoke to an arm, the connection at each end of each reach rod allowing limited universal movement.

2. The combination of claim 1 in which the coil is concentric with the drum and the spring is mounted centrally of the coil.

3. The combination of claim 2 in which each shoe is pivoted on its arm and includes means for adjusting the friction of the pivot connection.

4. The combination with an electric motor having a housing and a shaft projecting therefrom, of an electric brake including, a housing connected to the motor housing, a brake drum mounted on the shaft inside the brake housing, a pair of diametrically opposed brake shoes, a pair of arms pivoted in the housing and each pivotally supporting a shoe, yoke means interconnecting the free ends of the arms, an armature pivotally supporting the yoke means and pivotally mounted in the housing, a coil adjacent the armature to attract the armature when the coil is energized, said yoke means moving to spread the arms and move the shoes from the drum when the coil is energized, a spring biasing the armature from the coil to engage the shoes on the drum when the coil is de-energized, the pivot axes of the arms and yoke means being parallel and the pivot axis of the armature being transverse thereto, and said yoke means including a yoke and a reach rod connected to each arm and one end of the yoke by means allowing limited universal movement in the connection.

5. The combination of claim 4 including a manually operable shaft projecting from the brake housing, a cam on the shaft inside the housing and operative to engage the armature and move it against the spring bias to disengage the brake when the manual shaft is turned.

References Cited
UNITED STATES PATENTS
874,186   12/1907   Haldy _____ 188—171

DUANE A. REGER, *Primary Examiner.*